(12) United States Patent
Ono et al.

(10) Patent No.: US 7,661,703 B2
(45) Date of Patent: Feb. 16, 2010

(54) AUTOMOBILE INTERIOR STRUCTURE AND HEADLINER INTERIOR MATERIAL

(75) Inventors: Kotaro Ono, Toyota (JP); Koichi Ikawa, Nagoya (JP)

(73) Assignee: Hayashi Engineering Inc., Nagoya-shi, Aichi (JP)

( * ) Notice: Subject to any disclaimer, the term of this patent is extended or adjusted under 35 U.S.C. 154(b) by 250 days.

(21) Appl. No.: 11/732,167

(22) Filed: Apr. 3, 2007

(65) Prior Publication Data
US 2007/0228702 A1    Oct. 4, 2007

(30) Foreign Application Priority Data
Apr. 4, 2006  (JP) .............................. 2006-103082

(51) Int. Cl.
 B60R 21/213    (2006.01)
 B60R 21/215    (2006.01)
(52) U.S. Cl. .............. 280/730.2; 280/728.2; 280/728.3
(58) Field of Classification Search .............. 280/728.2, 280/728.3, 730.2; 296/214
 See application file for complete search history.

(56) References Cited

U.S. PATENT DOCUMENTS

| 6,173,990 | B1 * | 1/2001 | Nakajima et al. | ........ 280/730.2 |
| 6,367,872 | B1 * | 4/2002 | Bohm et al. | ................. 296/214 |
| 6,485,048 | B2 * | 11/2002 | Tajima et al. | ............ 280/728.2 |
| 6,616,222 | B1 * | 9/2003 | Ponceau | ..................... 296/214 |
| 6,705,640 | B2 * | 3/2004 | Takahashi | ................ 280/730.2 |
| 6,969,100 | B2 * | 11/2005 | Totani et al. | ............... 296/1.02 |
| 2005/0029780 | A1 * | 2/2005 | Tanase | .................... 280/730.2 |
| 2005/0046160 | A1 * | 3/2005 | Totani et al. | ............ 280/730.2 |
| 2005/0052001 | A1 * | 3/2005 | Totani et al. | ............ 280/728.2 |
| 2007/0132212 | A1 * | 6/2007 | Davey et al. | ............. 280/728.3 |
| 2009/0096254 | A1 * | 4/2009 | Spamer | .................... 296/214 |

FOREIGN PATENT DOCUMENTS

JP    2000-071928    3/2000

* cited by examiner

Primary Examiner—Paul N Dickson
Assistant Examiner—Laura Freedman
(74) Attorney, Agent, or Firm—Yokoi & Co., U.S.A., Inc.; Peter Ganjian

(57) ABSTRACT

A cut that widens a through hole of an end portion of a headliner interior material breaks when an airbag is deployed, and is formed on an exterior-side of the end portion. The end portion of the headliner interior material is in close contact with a surrounding member provided around the end portion. In addition, an accessory is passed through the through hole and fixed to a body, while the end portion of the headliner interior material is held to the accessory around the through hole. When the airbag installed folded on the exterior side of the headliner interior material is deployed, the airbag deploys into a cabin from between the end portion and the surrounding member.

2 Claims, 10 Drawing Sheets

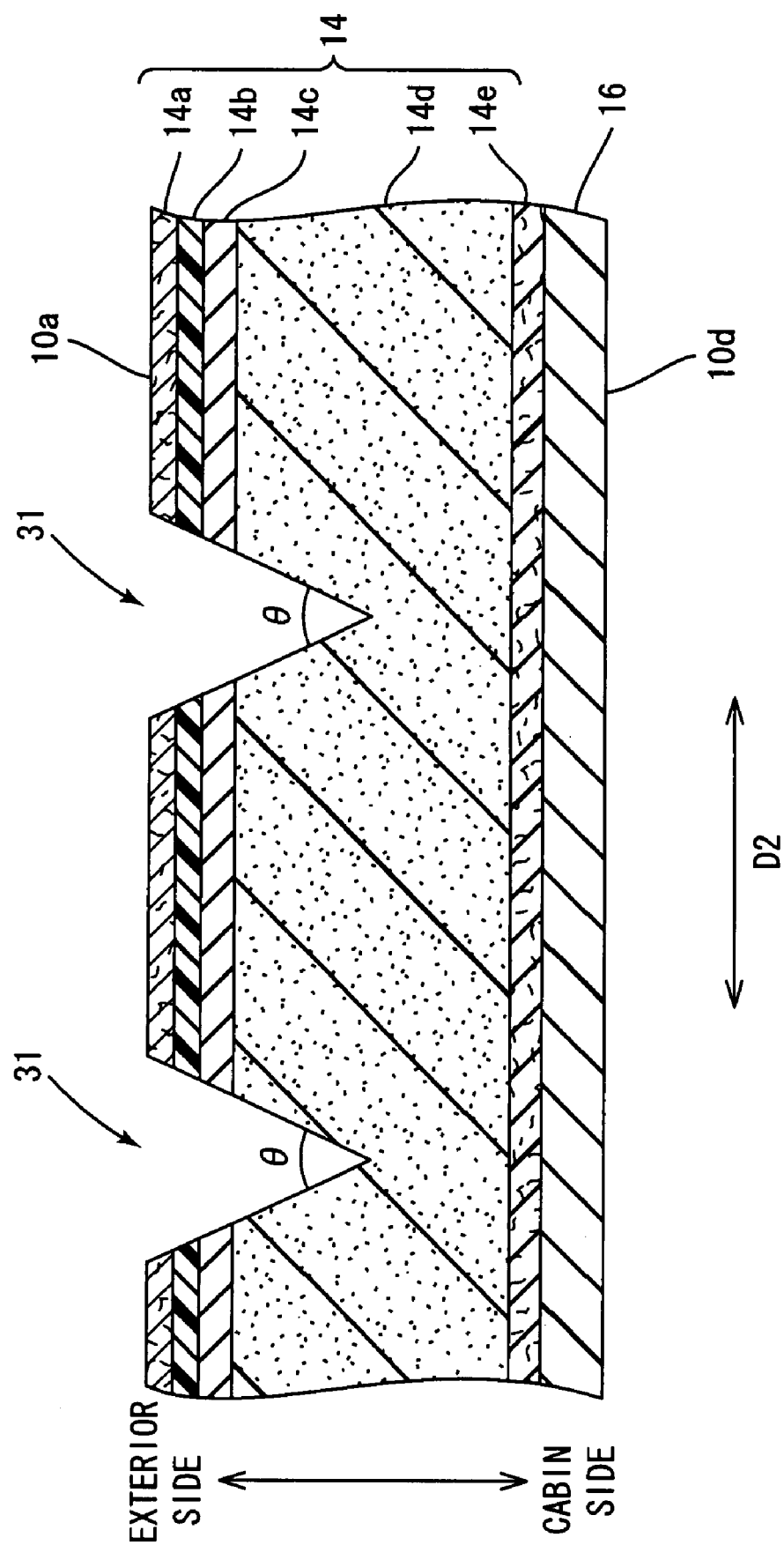

AUTOMOBILE INTERIOR STRUCTURE AND HEADLINER INTERIOR MATERIAL

CROSS-REFERENCES TO RELATED APPLICATIONS

The present application is related to the Japanese Patent Application No. 2006-103082, filed on Apr. 4, 2006, the entire disclosure of which is expressly incorporated by reference herein.

BACKGROUND OF THE INVENTION

1. Field of the Invention

The present invention relates to an automobile interior structure, wherein upon deployment of a folded airbag mounted on an exterior side of a headliner interior material, the airbag deploys inside a vehicle cabin from between an end portion of the headliner interior material and surrounding members, and also relates to headliner interior material used for such a structure.

2. Description of the Related Art

Automobiles have various interior materials installed. A headliner interior material located on a ceiling portion forms a self-supporting base material, which is attached below a roof panel. A top surface of the headliner interior material faces inside a passenger compartment, and applied thereon is a cover material made from fabric or the like to heighten design. The headliner interior material is installed on the ceiling portion, and engaged and held with respect to the roof panel at a plurality of locations set at appropriate intervals to ensure that the headliner interior material does not sag or fall due to gravity.

An engaging element is attached to a general surface of a back surface of the headliner interior material, and the engaging element is used to engage the headliner interior material with the roof panel. Furthermore, a pillar garnish and an opening trim may be installed on the roof panel adjacent to the headliner interior material, and an edge portion of the headliner interior material may be placed on and held to an edge portion of the pillar garnish and a lip of the opening trim. An alignment is thus achieved by which the end portion of the headliner interior material does not sag. Moreover, various accessories such as coat hooks, assist grips, sun visors, and illumination lamps can be provided on a vehicle cabin side of the headliner interior material.

A curtain airbag is installed along the back of right and left edge portions of the headliner interior material so as to be normally unseen from the passenger compartment. In the event that an impact of a certain intensity or higher is detected, an inflator is activated. This deploys the curtain airbag so as to instantly expand and hang downward curtain-like between an occupant and a right or left door window, thereby protecting the occupant from an encounter with a side object. For downward expansion of the curtain airbag, the headliner interior material is released from the support of the pillar garnish and the opening trim such that a clearance (outlet) is formed between the edge portion of the headliner interior material and the vehicle (body), thereby allowing the curtain airbag to expand while hanging down.

Japanese Patent Application Publication No. JP-A-2000-71928 discloses, as shown in FIG. 1 of the same document, that a narrow groove (9) extending in the longitudinal direction of a vehicle body is provided on a surface on an exterior side of a roof trim (8). A mobile portion (8a) is formed lower than the groove (9) of the roof trim, and a bottom edge of the mobile portion (8a) and a top edge of a pillar garnish (5) face each other. Activation of an inflator (16) delivers gas into a protection bag (1), thereby thrusting the bag (1) onto the mobile portion (8a) below the groove (9) such that the mobile portion (8a) opens outward to inside a vehicle cabin.

As mentioned above, various accessories are provided on the vehicle cabin side of the headliner interior material. Thus, the airbag should deploy from between the end portion of the headliner interior material and surrounding members, such as opening trim and pillar garnish which surround the end portion of the headliner interior material, and at the same time any accessories should be reliably prevented from falling when the airbag is deployed.

BRIEF SUMMARY OF THE INVENTION

An advantage of some aspects of the invention is to provide an automobile interior structure and a headliner interior material to deploy an airbag from between an end portion of a headliner interior material and a surrounding member, while reliably preventing an accessory from falling when the airbag is deployed.

One aspect of the present invention provides an automobile interior structure, wherein an end portion of a headliner interior material provided on an inner side of a vehicle body is in close contact with a surrounding member provided around the end portion at a ceiling portion of a cabin; and an airbag installed in a folded state on an exterior side of the headliner interior material, upon deployment, is deployed into the cabin from between the end portion and the surrounding member, wherein the end portion of the headliner interior material is formed with a through hole;

an accessory is passed through the through hole and fixed to the vehicle body, and holds the end portion of the headliner interior material around the through hole; and the end portion of the headliner interior material has an exterior-side surface formed with a cut that breaks upon airbag deployment and widens the through hole.

Another aspect of the present invention provides a headliner interior material formed on an inner side of a vehicle body at a ceiling portion of a cabin, wherein an end portion thereof is in close contact with a surrounding member provided around the end portion; and an airbag installed in a folded state on an exterior side thereof, upon deployment, is deployed into the cabin from between the end portion and the surrounding member, wherein the end portion is formed with a through hole through which an accessory passes and is fixed to the vehicle body while holding the end portion, and is also formed with a cut on an exterior-side surface thereof that breaks upon airbag deployment and widens the through hole.

A cut formed on an exterior-side surface of the end portion of the headliner interior material breaks and widens a through hole in the end portion when the airbag is deployed. This in turn facilitates the passage of a cabin-side part of the accessory holding the end portion of the headliner interior material through the through hole. Therefore, falling of the accessory upon airbag deployment is reliably prevented.

The surrounding member include a pillar garnish, a door opening trim, and the like.

The following may be performed to put the end portion of the headliner interior material in close contact with the surrounding member: matching an edge portion of the end portion against an edge portion of the surrounding member; inserting the edge portion of the end portion into a groove formed on the surrounding member; matching the edge portion of the surrounding member against a cabin-side surface of the end portion; and contacting and latching the cabin-side surface of the end portion with a back surface of the edge portion of the surrounding member. In addition, to achieve close contact between the end portion and the surrounding member, a headliner-side clip attached to the end portion may be fitted with a cabin-side clip attached to the vehicle body so as to bring the end portion and the surrounding member in close contact. Alternatively, close contact between the end portion and the surrounding member may also be achieved without the use of the clips.

Conceivable cuts include a cut that connects with the through hole, and a cut formed around the through hole. Alternatively, a linear cut, a groove with a V-shaped cross section, and the like are also conceivable. Methods such as the following are conceivable for forming the cut: a method in which a back surface side of the headliner interior material is cut with a sharp cutter, and a method in which a shape for the cut is formed in a molding die for the headliner interior material so that the cut is formed at the same time the headliner interior material is molded.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIG. 10 is an exemplary illustration of a vertical end view showing a modification example of the end portion of the headliner interior material from a position taken along the line A2-A2 in FIG. 5.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

Hereinafter, an embodiment of the present invention will be described in the following order:

(1) the configuration of the automobile interior structure;

(2) the operation and effects of the automobile interior structure; and (3) a modification example thereof

(1) Configuration of Automobile Interior Structure

Figure 1:
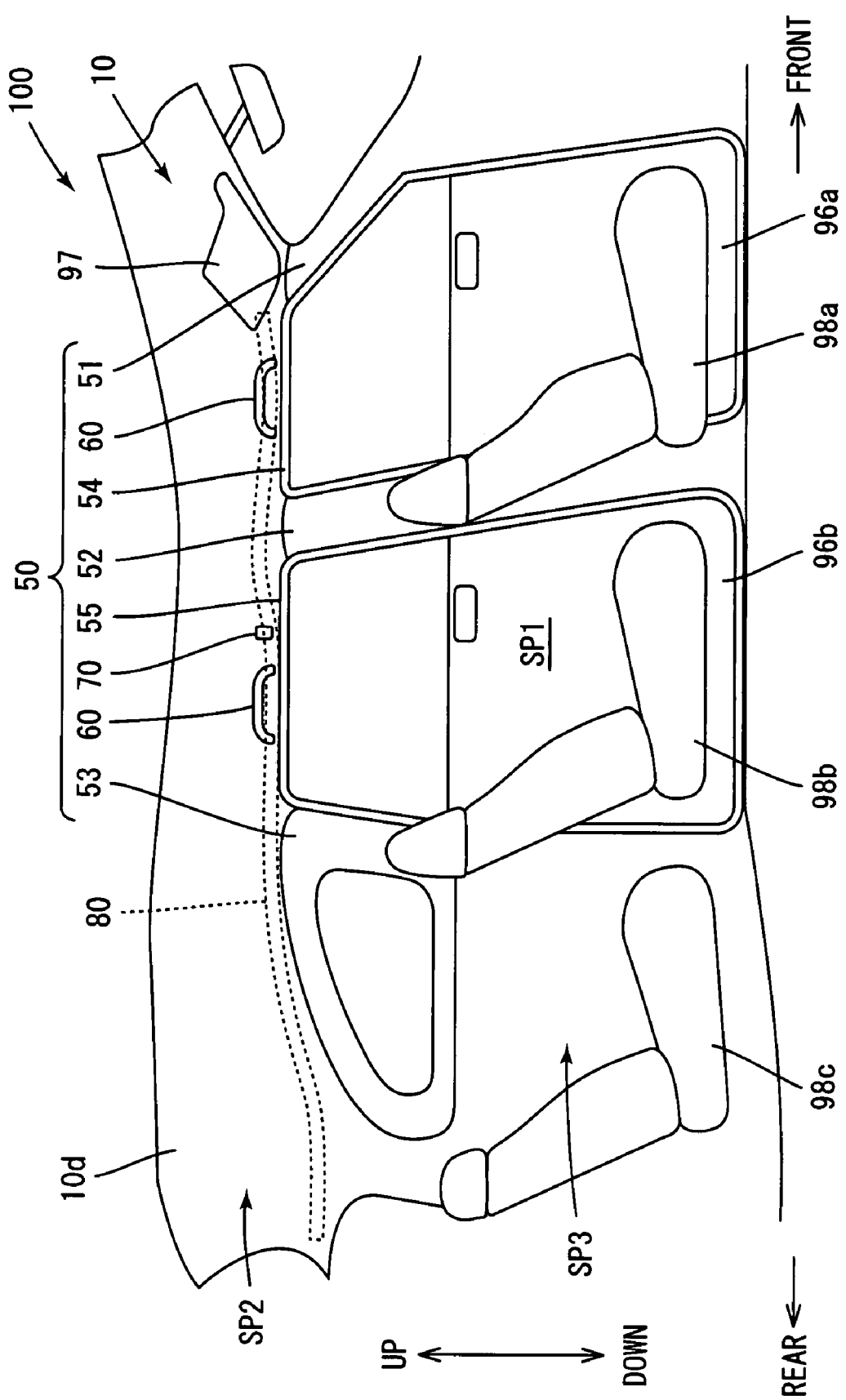
FIG. 1 is an exemplary illustration of a side view showing a main portion of an interior of an automobile to which an automobile interior structure according to the present invention is applied.
Figure 2:
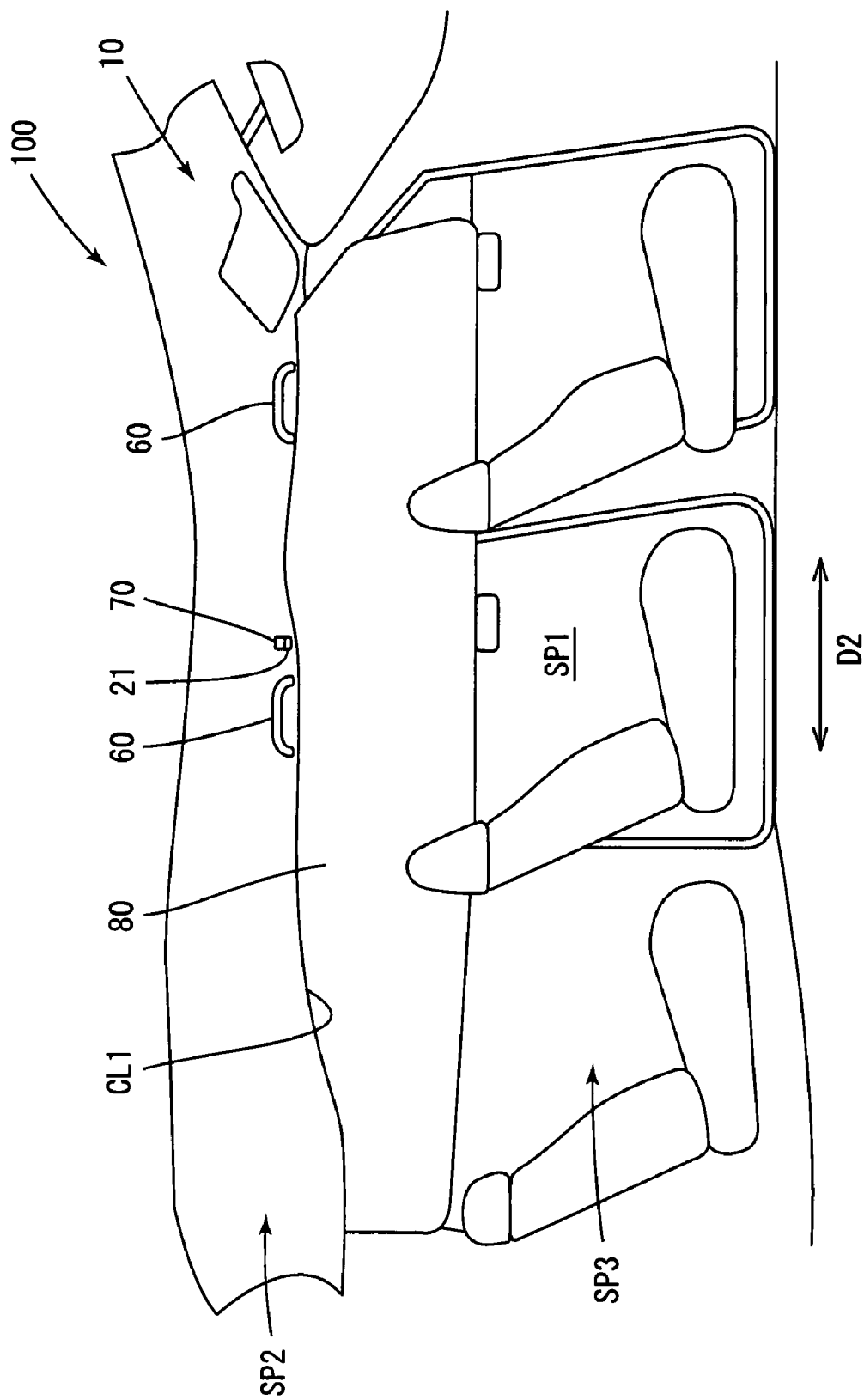
FIG. 2 is an exemplary illustration of a side view showing a deployed state of an airbag.
Figure 3:
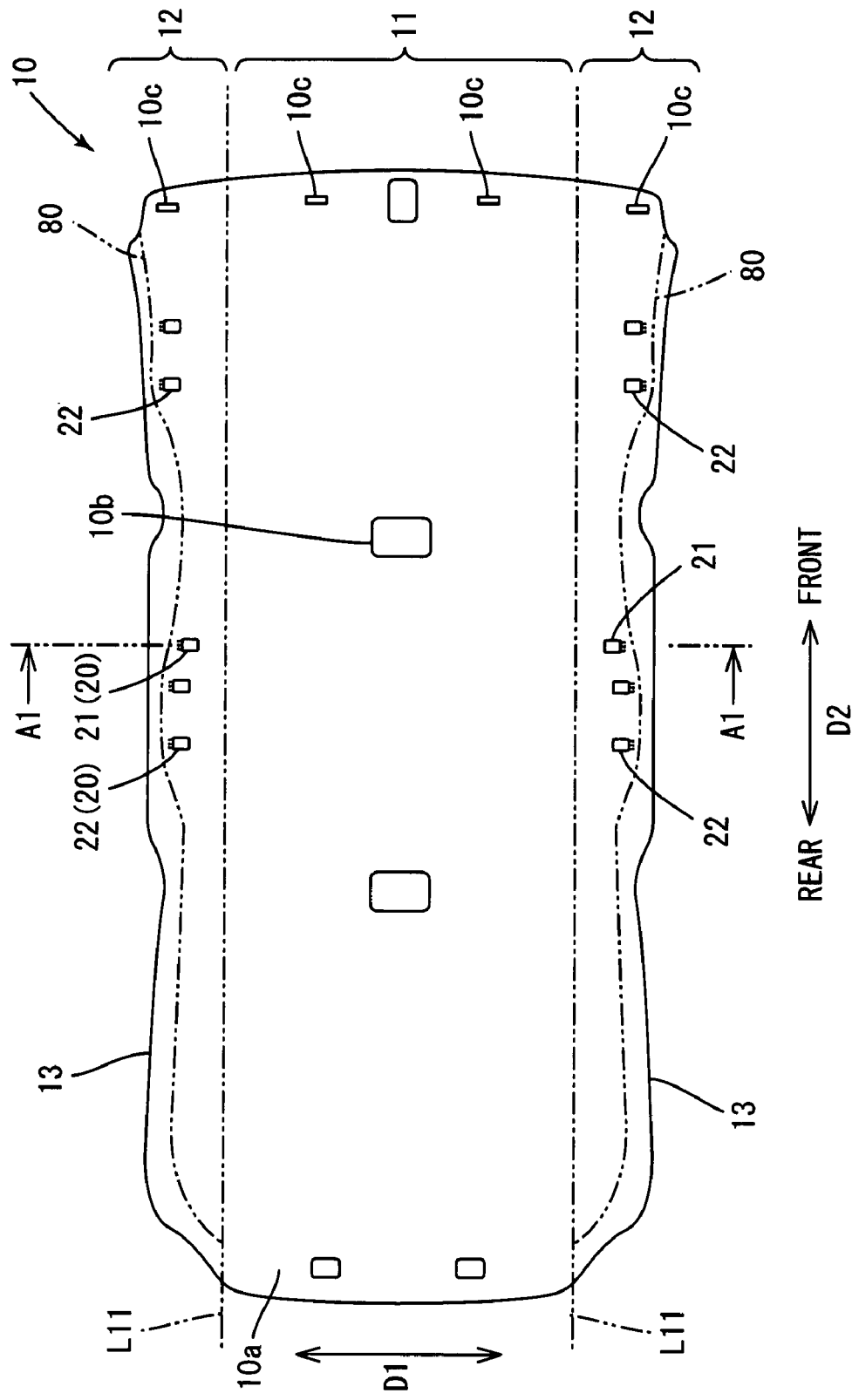
FIG. 3 is an exemplary illustration of a plane view showing a headliner interior material from above.
Figure 4:
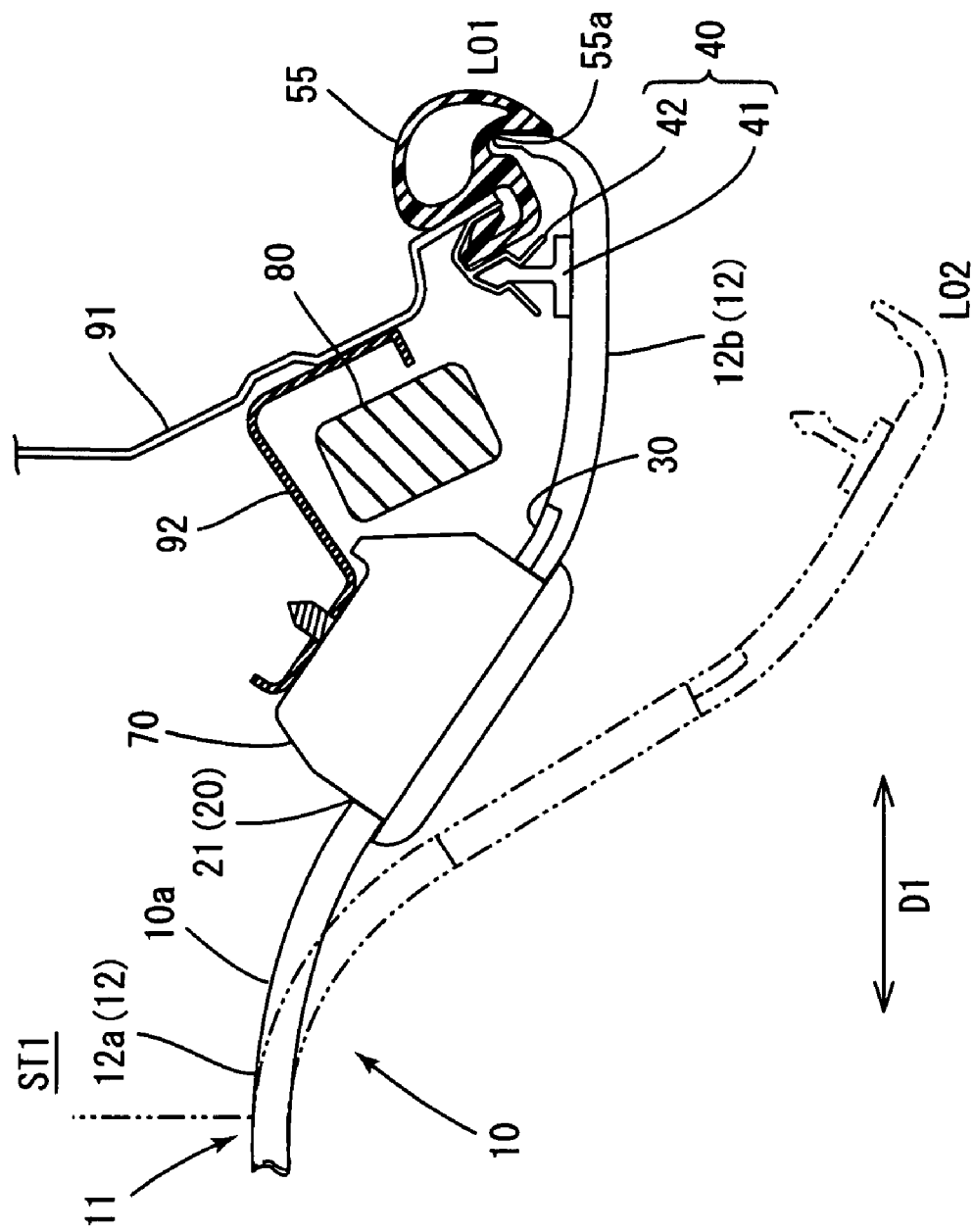
FIG. 4 is an exemplary illustration of a vertical cross-sectional view showing the automobile interior structure from a position taken along a line A1-A1 in FIG. 3.
Figure 5:
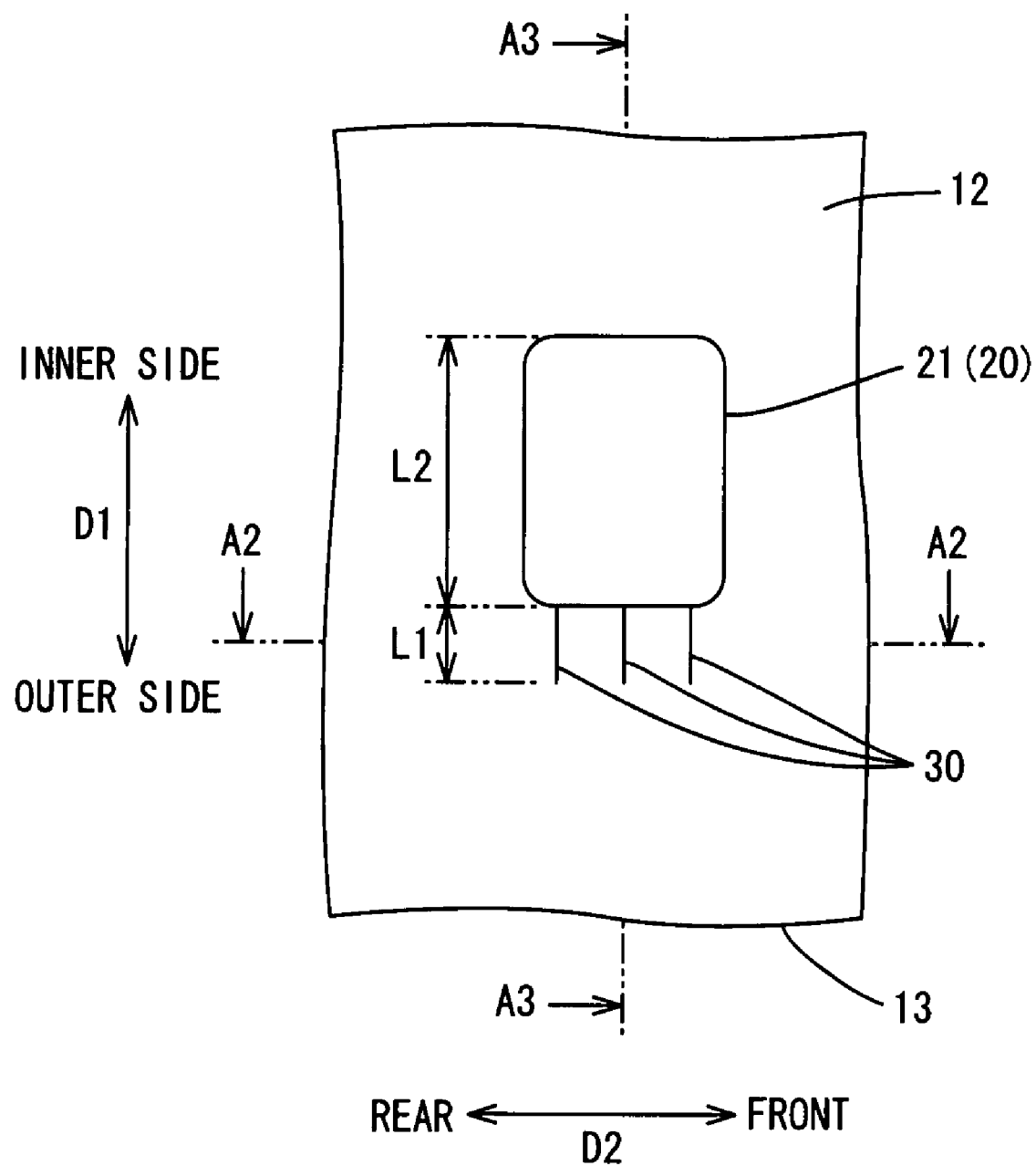
FIG. 5 is an exemplary illustration of a view from an exterior side showing an end portion of the headliner interior material formed with cuts.
Figure 6:
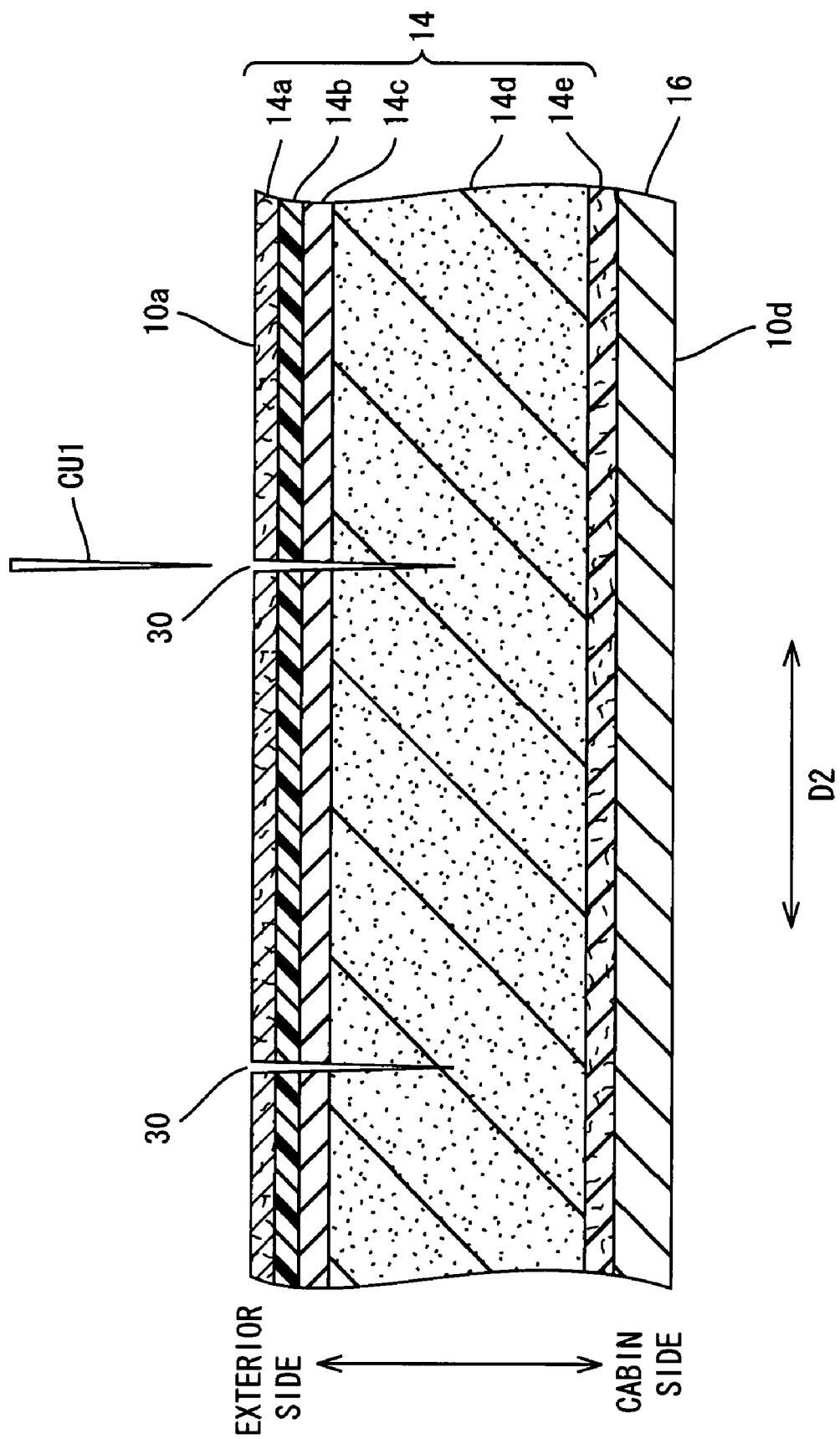
FIG. 6 is an exemplary illustration of a vertical end view showing the end portion of the headliner interior material from a position taken along a line A2-A2 in FIG. 5.
Figure 7:
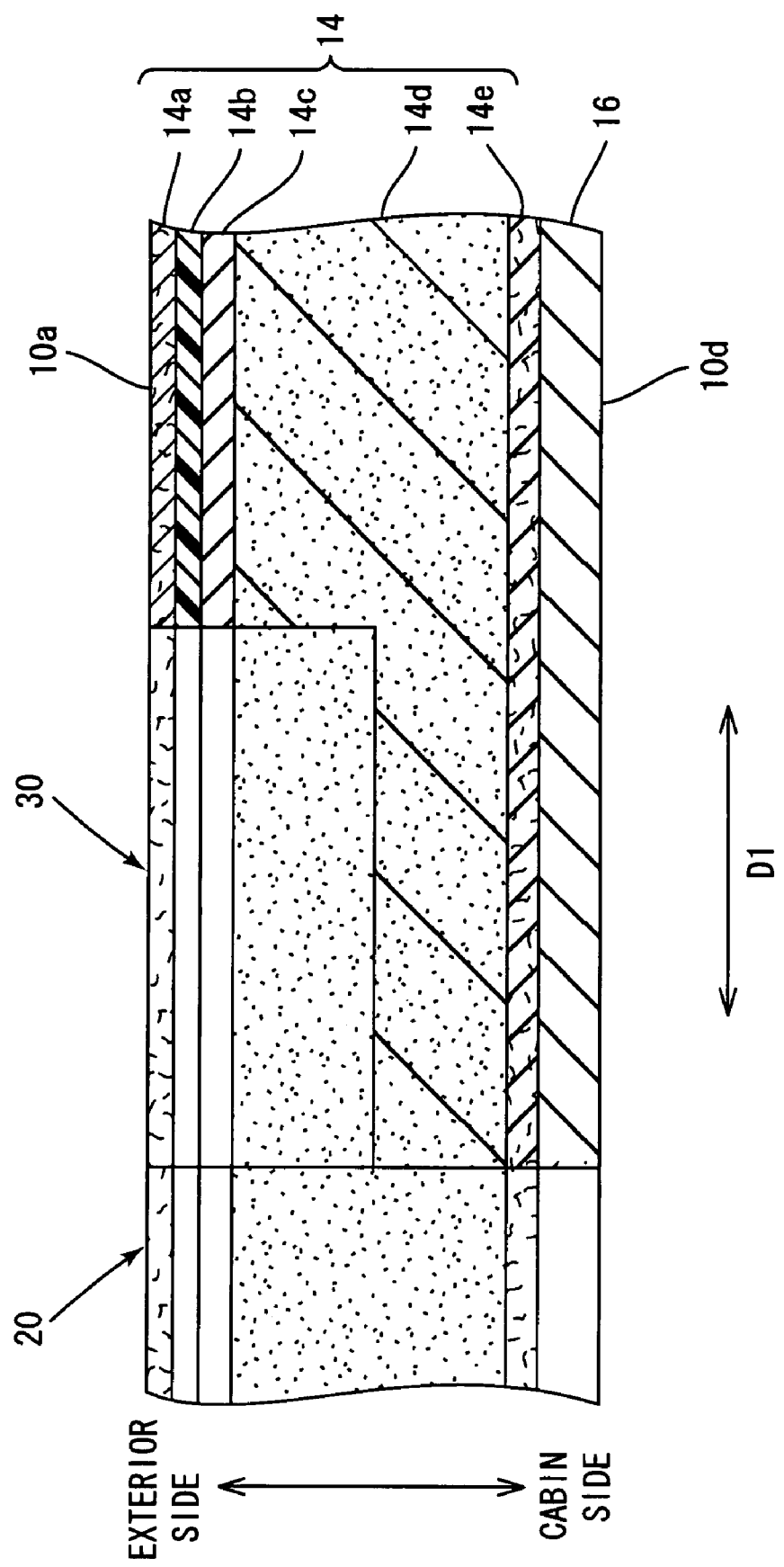
FIG. 7 is an exemplary illustration of a vertical cross-sectional view showing the end portion of the headliner interior material from a position taken along a line A3-A3 in FIG. 5.
Figure 8:
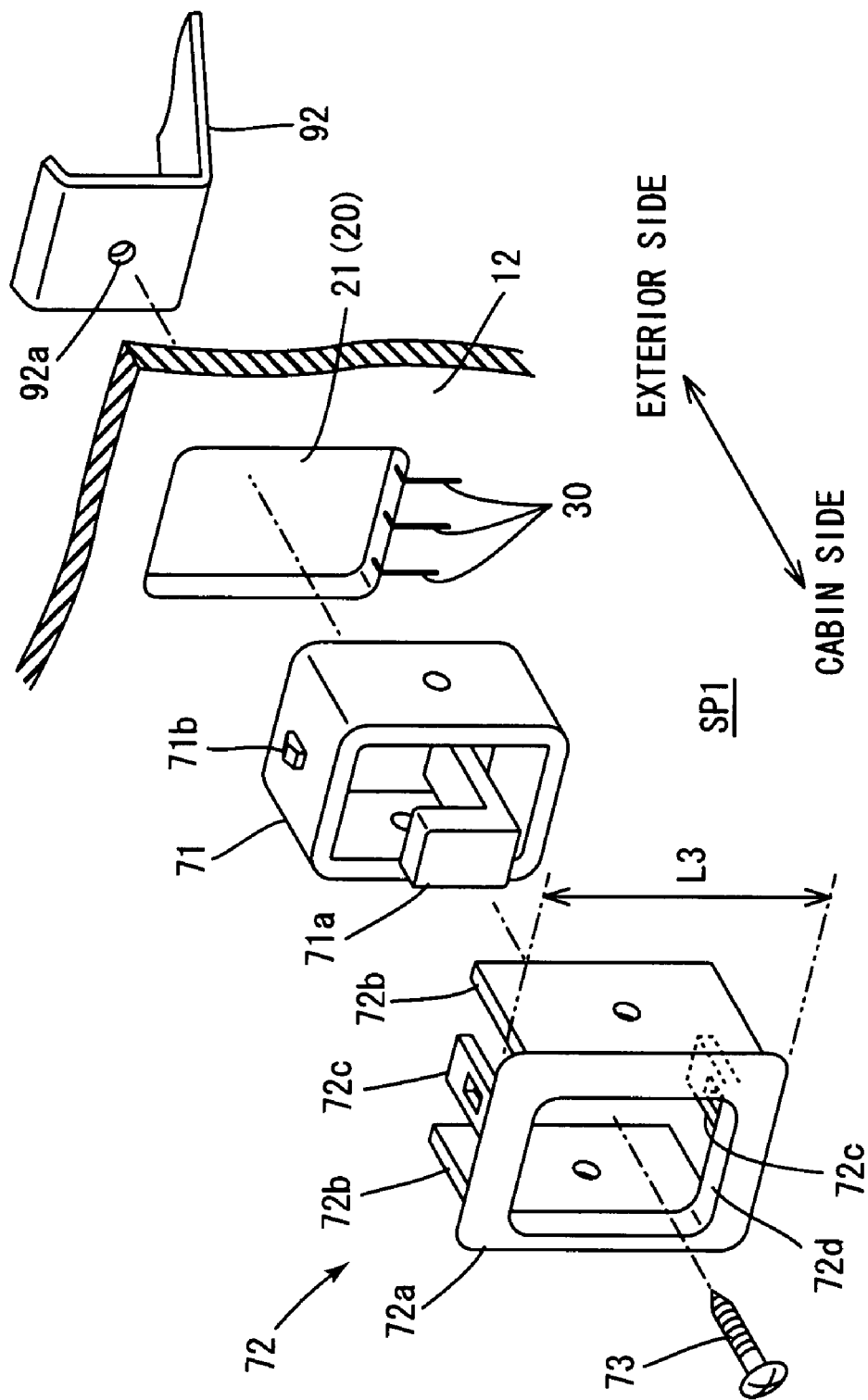
FIG. 8 is an exemplary illustration of an exploded perspective view showing how a coat hook is assembled and fixed to a vehicle body.
Figure 9:
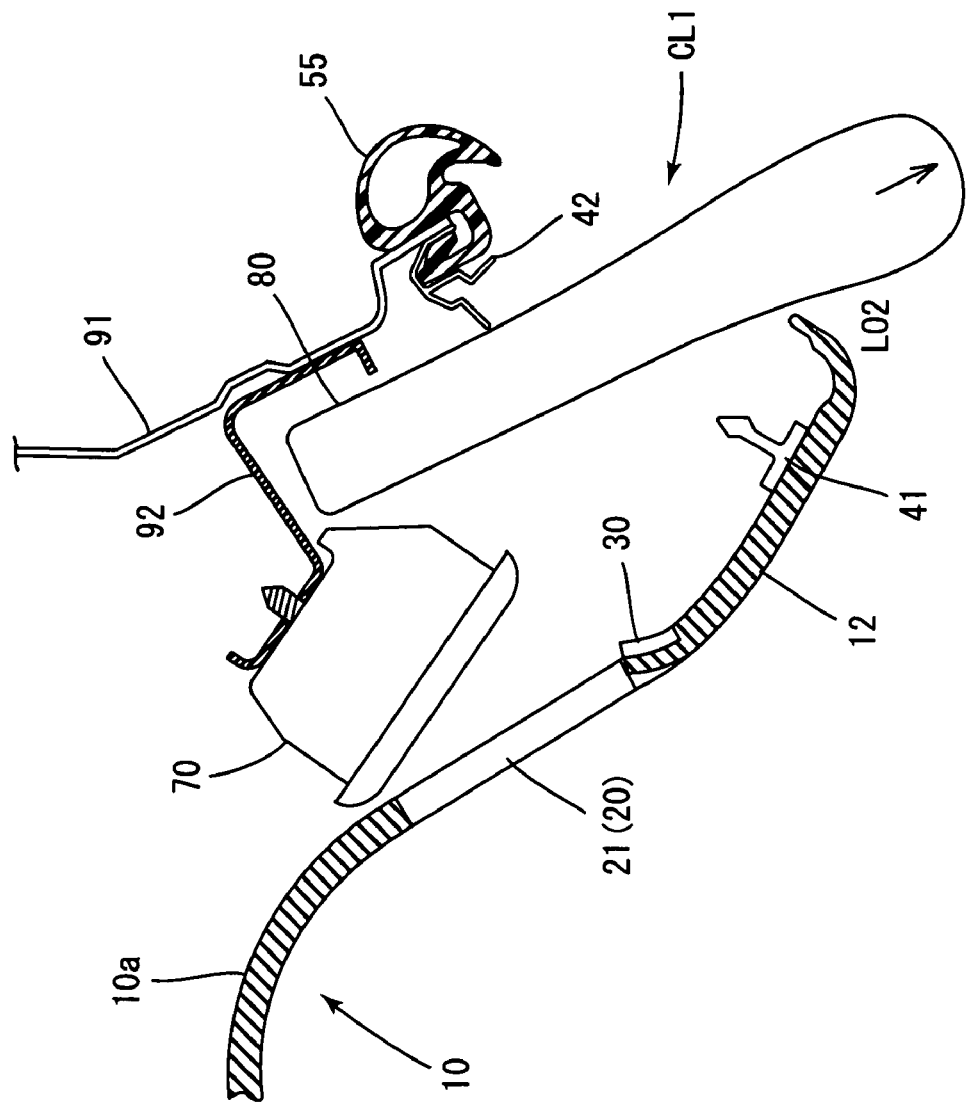
FIG. 9 is an exemplary illustration of a vertical cross-sectional view showing an operation of the end portion of the headliner interior material when the airbag is deployed.

FIG. 1 is a side view showing a main portion of an interior of a road-traveling automobile 100 to which an automobile interior structure ST1 according to an embodiment of the present invention is applied. FIG. 2 is a side view showing a deployed state of an airbag 80. FIG. 3 is a plane view showing a headliner interior material 10 from above according to the embodiment of the present invention. FIG. 4 is a vertical cross-sectional view showing the automobile interior structure ST1 from a position taken along a line A1-A1 in FIG. 3. FIG. 5 is a view from an exterior side showing an end portion 12 of the headliner interior material formed with cuts 30. FIGS. 6 and 7 are views showing a vertical cross section of the end portion 12 of the headliner interior material. FIG. 8 is an exploded perspective view showing how a coat hook 70 is assembled and fixed to a vehicle body 91. FIG. 9 is a vertical cross-sectional view showing an operation of the end portion of the headliner interior material when the airbag is deployed.

The automobile 100 according to the present embodiment is a passenger vehicle of the station wagon type that is designed and equipped so as to be used on roads. However, the present invention is also applicable to sedans and other types of vehicles. In addition, the present automobile is a motor vehicle provided with three rows of seats 98a, 98b, and 98c, although the present invention is also applicable to motor vehicle types with only two rows of seats or the like.

The present automobile is provided with a front window and instrument panel in front of the front seats 98a. An A pillar (front pillar) is provided before a front door 96a; a B pillar (center pillar) is provided between the front door 96a and a rear door 96b; a C pillar is provided after the rear door 96b; and a D pillar is provided after a quarter window thereafter. The pillars are used for supporting a ceiling. A body panel 91 forming the body of the present automobile is made of metal, for example, and surrounds a cabin SP1.

A door trim interior material is provided on the cabin SP1 side of the passenger doors 96a and 96b. A headliner interior material 10 (also simply called a headliner) is provided on an inner side of the body panel (body) 91 in a ceiling space SP2 of the cabin SP1.

Referring to FIGS. 3 and 4, the headliner interior material 10 is a structure having both right and left end portions 12 and 12 in a vehicle width direction D1, and a body portion 11 that connects the end portions 12 and 12 on inner sides thereof in the vehicle width direction D1. The body portion 11 is arranged to face in a generally horizontal direction and bulges slightly upward to have a curved shape whose curvature is nearly zero (i.e., whose curvature radius R1 is large). The respective end portions 12 and 12 are structures having a curvature-changing portion 12a that bends downward from an edge portion in the vehicle width direction D1 of the body portion 11, while facing an outer side in the vehicle width direction; and an extending portion 12b that extends from the edge portion in the vehicle width direction of the curvature-changing portion toward the outer side in the vehicle width direction. Furthermore, the curvature-changing portion 12a has a curved shape with a portion whose exterior side bulges in the vehicle width direction and whose curvature is larger than the curvature of the body portion 11 (i.e., a portion whose curvature radius is smaller than the curvature radius of the body portion).

Also, to facilitate bending of the end portion 12 toward the cabin side when the airbag is deployed, cuts are formed on a back surface 10a at the position of lines LI1 and LI1, which appropriately divide the body portion 11 and the end portion 12. The cuts are only formed on the back surface 10a so as not to reach a top surface 10d.

Automobile accessories such as an assist grip 60, a coat hook 70, a sun visor 97, and a dome light are provided on the top surface 10d on the cabin SP1 side of the headliner interior material 10. The headliner interior material 10 is also formed with through holes 22, 21, 10c, and 10b, which penetrate through and fix the accessories on the body panel 91. The assist grip 60 of the present automobile is provided at four locations for the ingress and egress of passengers in the front and second rows. The through hole 22 (20) penetrating through a portion of the assist grips 60 is formed at eight locations of the end portion 12 in the vehicle width direction D1 of the headliner interior material 10. The through hole 21 (20) penetrating through a portion of the coat hook 70 is formed at two locations of the end portion 12 of the headliner interior material 10. The through hole 10c penetrating through a portion of the sun visor 97 is formed at four locations of an end portion on a front side of the headliner interior material 10. The through hole 10b penetrating through a portion of the dome light is formed at two locations of the body portion 11 of the headliner interior material 10.

In the headliner interior material 10, the assist grip 60 is fastened together with the body panel 91 using an assist grip fixing instrument formed from a nut and a bolt; the coat hook 70 is fastened together with the body panel 91 using a hook fixing portion 92 and a screw 73; and the sun visor 97, the dome light, etc., are also fastened together with the body panel 91.

An A pillar garnish 51 is provided on the cabin side of the A pillar, and a B pillar garnish 52 is fixedly attached to the body panel 91 on the cabin side of the B pillar. A C/D pillar integrated garnish 53 is fixedly attached to the body panel 91 on the cabin side of the C and D pillars. Door opening trims 54 and 55 are provided on the body panel 91 at positions fringing the openings of the doors 96a and 96b. The pillar garnishes 51 to 52 and the door opening trims 54 and 55 are designated as a side-surface side interior material (a surrounding member) 50, which is provided surrounding the end portion 12 of the headliner interior material 10 at a side surface portion SP3 of the cabin SP1. An upper edge of the side-surface side interior material 50 is formed facing a longitudinal direction D2 of the automobile. The upper edge of the side-surface side interior material 50 and the end portion 12 of the headliner interior material 10 face each other and are in close contact.

As FIG. 4 shows, provided in the vicinity of the coat hook 70 is a fitting structure 40 that has a headliner-side clip 41 and a body-side clip 42. The headliner-side clip 41 is fixedly attached to the back surface 10a on the exterior side of the end portion 12, and the body-side clip 42 is fixedly attached to a surface on the cabin side of the body panel 91. Note the figure shows a side view of the coat hook 70 and the clips 41 and 42, while only an upper portion of the door opening trim 55 is shown. The position of the end portion 12 when the airbag is deployed is shown by a double-dashed line.

Both the clips 41 and 42 are mutually and detachably engaged in the direction that the engagement is released when the airbag is deployed (a generally vertical direction). Furthermore, the clips 41 and 42 insert an edge portion 13 in the vehicle width direction D1 of the headliner interior material 10 into a groove 55a formed in the upper portion of the door opening trim 55, such that the end portion 12 and the door opening trim 55 are in close contact.

The airbag 80 is provided in a folded state on the respective right and left exterior sides of the end portion 12 in the vehicle width direction D1 of the headliner interior material 10. In the automobile interior structure according to the present invention, when the folded airbag 80 is deployed, the airbag opens into the cabin from between the end portion 12 and the side-surface interior material 50.

The airbag 80 is also called a shield curtain airbag, and is arranged on both side edge portions in the vehicle width direction D1 of the automobile 100 to generally face the longitudinal direction D2. The airbag 80 is formed from fabric with a predetermined airtightness such as non-woven fabric, and is formed into a flat bag shape that partitions an inner portion into a plurality of cells. Moreover, the deflated airbag 80 is folded and fixedly attached to the body panel 91 so as to be disposed between the headliner interior material 10 and the body panel 91. If a vehicle side impact is detected by a side impact sensor, then an inflator is activated by the control of an electronic control unit and gas accumulated in the inflator is sent to each cell inside the airbag 80. As a consequence, the airbag 80 rapidly expands and hits against the end portion 12 of the headliner interior material 10. This accordingly releases the headliner-side clip 41 from the body-side clip 42, and releases the end portion 12 from the upper edge of the side-surface side interior material 50. Thus, a clearance CL1 is formed between the end portion 12 and the side-surface side interior material 50. As FIG. 2 shows, the airbag 80 then hangs downward from the clearance CL1 and deploys to inside the cabin so as to protect occupants from a side impact.

The airbag 80 has a longer length in the longitudinal direction, and is arranged along both sides of the back surface 10a of the headliner interior material 10 so as to face the longitudinal direction D2 lengthwise. The airbag 80 is positioned approximately 40 to 60 millimeters farther inward than the edge portion 13 of the headliner interior material 10. Around the accessories 60 and 70, the airbag 80 is disposed farther outward in the vehicle width direction D1 than the accessories 60 and 70, and designed so as not to contact the accessories 60 and 70 when expanding downward.

Formed in the end portion 12 of the headliner interior material 10 are the through holes 20 that penetrate through the accessories 60 and 70 supporting the end portion 12 and are fixed to the body panel 91. The cuts 30 are formed in the back surface 10a on the exterior side of the end portion 12, which break when the airbag 80 is deployed so as to widen the through hole 20.

As FIG. 5 shows, the through hole 20 is formed as a rectangle with rounded corners, with two sides facing the vehicle width direction D1 and the other two sides facing the longitudinal direction D2. The through hole 20 penetrates from the cabin side to the exterior side. There are three cuts 30 in the present embodiment that are formed on the back surface 10a of the end portion 12 so as to be connected to the through hole 20. The cuts 30 also face from the edge portion on the vehicle width direction D1 outward side of the through hole 20 toward the vehicle width direction D1 outer side.

As FIGS. 6 and 7 show, the headliner interior material 10 is an integration of a cover material 16 layered on a cabin-side surface of a base material 14. The base material 14 in the present embodiment is formed from layering a non-woven fabric layer 14a, an air blocking layer 14b, an exterior-side reinforcement layer 14c, a base layer 14d, and a cabin-side reinforcement layer 14e, in that order from exterior side toward cabin side. A structure in which the base layer 14d is sandwiched by the reinforcement layers 14c and 14e forms the basic structure of the base material 14.

The base layer 14d is formed with the greatest thickness among the respective layers 14a to 14e. Furthermore, the base layer 14d is formed to have a weight per unit area of approximately 100 to 500 g/m$^2$ and a thickness of approximately 3.0 to 10.0 millimeters.

Substances such as the following may be used in the base layer 14d: a substance formed from expanding a thermoplastic or other resin; a substance formed from an expanded resin that has been impregnated or coated with a binder; and a substance formed from assembling fiber. The substance formed from an expanded resin that has been impregnated or coated with a binder may use, for example, a commonly known rigid urethane foam that has been solidified or hardened by impregnating slab urethane (urethane foam) with a binder. The binder may use, for example, a thermosetting resin such as an isocyanate resin. If the base layer 14d is formed by a rigid urethane foam, then the rigid urethane foam may be formed from heat press molding a base material that has been formed from impregnating or coating 100 to 500 g/m$^2$ of slab urethane with approximately 10 to 50 g/m$^2$ of an isocyanate binder.

For a base layer formed by assembling fiber, fibers such as the following may be used: thermoplastic resin fiber, fiber in which an additive material such as filler is added to thermoplastic resin, other resin fiber, and inorganic fiber. The following fibers may also be used: polyester fiber, polyamide fiber, acrylic fiber, polypropylene fiber, polyethylene fiber, rayon fiber, wood fiber, polyethylene terephthalate fiber, and material fiber in which an additive material such as filler is further added to any of these. Carbon fiber, glass fiber, and the like may be used as well.

The reinforcement layers 14c and 14e are laminated to the outer vehicle-side surface and the cabin-side surface of the base layer 14d, respectively, and reinforce the base layer 14d to secure the bending strength of the base material 14. The reinforcement layers 14c and 14e are formed by heat molding such as press molding so as to have a weight per unit area of approximately 50 to 500 g/m$^2$ and a thickness of approximately 0.1 to 2.0 millimeters. Substances such as the following may be used in the reinforcement layers 14c and 14e: a substance formed from assembling inorganic fiber, and solidified or hardened by a binder; and a hot-molded substance formed from assembling inorganic fiber and thermoplastic fiber. The inorganic fiber may be glass fiber, carbon fiber, or the like. The reinforcement layers 14c and 14e may use, for example, a substance in which 10 to 20 g/m$^2$ of an isocyanate binder is impregnated in a glass mat whose weight per unit area is approximately 100 g/m$^2$. In such case, the isocyanate binder also achieves the effect of adhering the reinforcement layers 14c and 14e with the base layer 14d during forming of the base material.

The air blocking layer 14b is laminated on an outer vehicle-side surface of the outer vehicle-side layer 14c, and blocks the air flow between the cab side and the exterior side. The air blocking layer 14b may use, for example, a thin resin film with a thickness of 10 to 30 μm. By stopping the air flow in the thickness direction of the base material, dust and the like is prevented from being sucked toward the top surface of the cover material. Using a polyamide resin film with a relatively high melting point for the air blocking layer 14b is appropriate from the standpoint of ensuring that there is no breakage during heat molding of the base material.

The non-woven fabric layer 14a is laminated on an outer vehicle-side surface of the air blocking layer 14b, and suppresses rubbing sounds. The non-woven fabric layer 14a may have, for example, a weight per unit area of approximately 10 to 30 g/m$^2$.

The cover material 16 forming the cabin-side surface 10d is a decorative layer laminated on a cabin-side surface of the cabin-side reinforcement layer 14e. The cover material 16 contributes to the interior material design, and carries the role of improving the feel of the interior material. In addition, the cover material 16 may be formed, for example, with an application volume of 100 to 200 g/m$^2$ and a thickness of approximately 0.2 to 8.0 millimeters. The cover material 16 may also use non-woven fabric, woven fabric, knitted fabric, and the like.

The headliner interior material 10 is formed, for example, by alignment with the ceiling space SP2 of the cabin according to the process below.

First, materials structuring the respective layers 14a to 14e mentioned above are stacked in that order, and then heated and fused with a thermoplastic binder. Next, the heated and stacked material is placed into a press molding die with a die face that matches the shape of the headliner interior material. The die is closed and press molding performed. The periphery of the molded material is subsequently trimmed to a shape that follows an outline of the automobile ceiling portion. After the molded material is released from the die, the through holes 10b, 10c, 21, 22 and the like are formed.

Thus, the headliner interior material 10 is made into a shape that follows the body panel 91 or the like, and machined into a shape held by the accessories 60 and 70 or the like.

Formation of the side surface-side interior material 50 supporting the end portion 12 of the headliner interior material 10 may, for example, be achieved by molding a resin such as various thermosetting resins and various thermoplastic resins including polypropylene and ABS resin into a predetermined shape by press molding, injection molding or the like to form a base material. An appropriate cover material is then applied to the cabin-side surface of such base material.

As FIG. 8 shows, the coat hook 70 has a structure provided with a body portion 71 that has a hook 71a from which to hang clothing or the like, a cover portion 72 that covers the cabin side of the body portion 71, and a metal screw 73 that fixes the body portion 71 to the hook fixing portion 92. The body portion 71 and the cover portion 72 are formed by molding a resin such as thermoplastic resin, for example. The body portion 71 is smaller than the size of the through hole 21, and able to pass through the through hole 21. Furthermore, an exterior-side surface of the body portion 71 is formed with a hole through which the screw 73 can be passed through and fixed. Regarding the cover portion 72, a cabin-side part 72a is larger than the size of the through hole 21, and an opening 72d is formed in the cabin-side part 72a through which the hook 71a passes through. Holding portions 72b and 72b and engagement portions 72c and 72c extend from the cabin-side part 72a toward the exterior direction. The engagement portions 72c and 72c are engageable with engagement portions 71b and 71b, which are formed on an upper portion and lower portion of the body portion 71. Thus, the body portion 71 is insertable between the respective portions 72b, 72b, 72c, and 72c. The respective portions 72b, 72b, 72c, and 72c are the same size or smaller than the size of the through hole 21, and can pass through the through hole 21.

In addition, the hook fixing portion 92 is made of metal, for example, and is fixed to the cabin-side surface of the body panel 91. The hook fixing portion 92 also has a hole 92a on a cabin-side end portion thereof through which the screw 73 is screwed and fixed.

Based on the above structure, insertion of the body portion 71 from the exterior side toward the cabin and between the respective portions 72b, 72b, 72c, and 72c engages the engagement portions 71b and 71b of the body portion 71 with the engagement portions 72c and 72c of the cover portion 72. As a consequence, the body portion 71 and the cover portion 72 are combined. At this time, the engagement portion 71b and the engagement portion 72c may be fused or welded by ultrasonic waves or the like. The body portion 71 is then passed through the through hole 21 from the cabin side toward the exterior side, and the screw 73 is used to fixedly attach the body portion 71 to the hook fixing portion 92, whereby the coat hook 70 is attached to the top surface 10d of the headliner interior material 10. Consequently, the coat hook 70 passes through the through hole 21 and is fixed to the body 91 while leaving the cabin-side part 72a in the cabin SP1. At the same time, the coat hook 70 holds the end portion 12 surrounding the through hole 21 by using the cabin-side part 72a to hook the end portion 12 surrounding the through hole 21.

Although not explained in detail, the assist grip 60 is also passed through the through hole 22 and fixed to the body 91 while leaving a cabin-side part in the cabin. At the same time, the assist grip 60 also holds the end portion 12 surrounding the through hole 22.

The above accessories 60 and 70 are provided on the cabin-side surface of the end portion 12 of the headliner interior material 10. Therefore, these accessories 60 and 70 should be reliably prevented from falling when the airbag 80 is deployed. In the present embodiment, the exterior-side surface 10a of the end portion 12 of the headliner interior material 10 is formed with a cut 30 that breaks to widen the through hole 20 upon airbag deployment.

Referring to the cross-sectional view in FIG. 7, the respective cuts 30 have a depth extending from the exterior-side surface 10a, through the non-woven cloth layer 14a, the air blocking layer 14b and the exterior-side reinforcement layer 14c, and up to a portion of the base layer 14d. Accordingly, the cut 30 cannot be seen from the cabin and does not easily gather dirt or the like, and therefore the appearance of the headliner interior material 10 can be satisfactorily maintained. Meanwhile, breakage of the cut 30 upon airbag deployment reliably prevents accessories from falling. From this standpoint at well, the depth of the cut 30 may have a depth other than partway through the base layer 14d. For example, depths extending partly through the exterior-side reinforcement layer 14c or the cabin-side reinforcement layer 14e may be used, as well as depths extending to between the respective layers 14c, 14d, 14e, and 16.

As the end view in FIG. 6 shows, the respective cuts 30 are formed using a sharp cutter CU1 to partly cut the base material 14 in the thickness direction. Moreover, the cuts 30 are formed into a shape with a linear cross section or narrow V-shaped cross section (with a holding angle θ, for example, being 0°≦θ≦15°) cut from a general surface of the back surface 10a of the end portion 12 toward the cabin side.

Note that the holding angle θ of a cut 31 forming a V-shaped cross section, such as shown in the cross-sectional view of FIG. 10, may be formed larger as approximately 45°≦θ≦90°.

Furthermore, shapes other than the above are conceivable for the cut, including a C-shaped cross section whose opening portion is on the back surface 10a side.

The number of cuts 30 may be one or more. Also note that a cut connecting adjacent cuts may be formed on the back surface 10a of the end portion 12.

The cut 30 has a linear shape in the present embodiment when viewing the back surface 10a of the headliner interior material 10. However, other shapes such as a bent line or curved line are also conceivable.

The cut 30 is located at a position toward the outer side in the vehicle width direction that is connected with the through hole 20. However, other positions such as the following are also conceivable: a position in the vicinity of the through hole 20 that is not connected to the through hole 20, a position toward the inner side in the vehicle width direction from the through hole 20, and a position in the longitudinal direction from the through hole 20.

The cut 30 is oriented in the direction of the vehicle width direction D1 in the present embodiment. However, the cut 30 may be oriented in the longitudinal direction D2, or a direction other than the directions D1 and D2.

As FIG. 5 shows, a length L1 of the cut 30 is smaller than a size L2 of the through hole 20 in the direction of the cut (the vehicle width direction D1). However, lengths other than that shown in the figure are conceivable. Also conceivable is L1≦L3−L2, where L3 is a length of the cabin-side part 72a of the accessory 70 in the direction of the cut (the vehicle width direction D1), as shown in FIG. 8. The length of the respective cuts 30 may all be the same length or different lengths.

After the through hole 20 is formed in the headliner interior material 10, the cut 30, for example, is formed by aligning the position of the cut 30 on the back surface 10a of the headliner interior material 10 and sliding the sharp cutter CU1 along the back surface 10a to make the cut. To slide the cutter CU1, the slide position of the cutter may be stored in a machine tool capable of storing the slide position and the machine tool used to slide the cutter, or the cutter may be slid by hand.

Note that the cut 30 may be formed by pressing a sharp cutter against the back surface 10a of the headliner interior material 10 to make the cut. Alternatively, the cut 30 may be formed as follows: a shape for the cut is formed in a die that punches out a through hole through which an accessory is to pass, and the shape is cut at the same time the through hole is punched out of a material molded for the headliner interior material 10. Furthermore, the cut 30 may be formed at the same time as press molding of the headliner interior material 10 by forming the shape for the cut in the press molding die for the headliner interior material 10.

(2) Operation and Effects of Automobile Interior Structure

The following sequence may be followed to form the automobile interior structure ST1.

First, the headliner interior material 10, the side surface-side interior material 50, the accessories 60 and 70, and the like are formed into predetermined shapes. The airbag 80 for the right and left is also prepared in a folded state. Next, the respective right and left airbags 80 are fixedly attached to the body panel 91 at a position contacting the end portion 12 of the headliner interior material 10 farther toward the outer side of the vehicle width direction than the accessories 60 and 70 during expansion of the airbag 80. The end portion 12 of the headliner interior material 10 and the upper edge of the side surface-side interior material 50 are put in close contact, and the headliner interior material 10 and the side surface-side interior material 50 are fixedly attached to the body panel 91. Furthermore, the accessories 60 and 70 are fixedly attached to the body panel 91 via the through hole 20, and the sun visor 97 and the like are also fixedly attached to the body panel 91. Thus, the automobile interior structure ST1 is formed.

Hereinafter, the operation and effects of the present structure ST1 will be explained with reference to FIGS. 4 and 9.

Once the airbag 80 starts to expand, first, the airbag 80 hits against the end portion 12 of the headliner interior material 10 at a position farther toward the outer side of the vehicle width direction than the accessories 60 and 70. Pressure from the contact with the airbag 80 releases the headliner-side clip 41 from the exterior-side clip 42. The end portion 12, which is at a position LO1 in close contact with the upper portion of the side surface-side interior material 50, thus bends toward the cabin SP1 side so as to create the clearance CL1 between the end portion 12 and the upper portion of the side surface-side interior material 50 for the airbag 80 to deploy into the cabin side. Here, the cabin-side part 72a of the coat hook 70 which holds the end portion 12 is larger than the size of the through hole 21 and the cut 30 is formed in the back surface 10a of the end portion 12. Therefore, the cut 30 breaks to widen the through hole 21 when the end portion 12 bends toward the cabin side. Accordingly, there is no large force from the end portion 12 applied on the coat hook 70, and the cabin-side part 72a easily passes through the through hole 21, such that the end portion 12 bends, for example, up to a position LO2 shown in FIG. 9. As a consequence, the airbag 80 smoothly expands into the cabin from the clearance CL1 between the end portion 12 and the door opening trim 55 (the side surface-side interior material 50). The airbag 80 hangs downward and deploys curtain-like in the cabin.

In the vicinity of the assist grip 60 as well, a similar operation breaks the cut 30 to widen the through hole 22. Accordingly, there is no large force from the end portion 12 applied on the assist grip 60, and the airbag 80 deploys into the cabin.

Unless a cut is formed in the end portion of the headliner interior material to widen the through hole, the end portion tends to apply a force on the accessory upon airbag deployment. The cut breaks to widen the through hole, thereby facilitating passage of the cabin-side part of the accessory through the through hole. Accordingly, when the airbag is deployed, the falling of accessories such as a coat hook and an assist grip can be reliably prevented, while also allowing the airbag to expand from between the end portion of the headliner interior material and the surrounding member. In addition, the cut is formed only on the exterior-side surface of the headliner interior material, and therefore the cut is not visible from the cabin. Thus, the appearance of the headliner interior material can be satisfactorily maintained. At the same time, the accessory can be reliably prevented from falling while allowing the airbag to deploy.

(3) Modification Example

The headliner interior material 10 may also be a base material provided with only some or none of the following: the non-woven layer 14a, the air blocking layer 14b, the exterior-side reinforcement layer 14c, the cabin-side reinforcement layer 14e, and the cover material 16. In such case, the effect of satisfactorily maintaining the appearance of the headliner interior material while reliably preventing the accessory from falling can be obtained provided that the cut to widen the through hole is formed only on a surface on the exterior side.

Note that the present invention is not particularly limited to the embodiment and the modification example described above, and also includes configurations that modify the combination of or mutually substitute the respective structures disclosed in the above embodiment and modification example, as well as configurations that modify the combination of or mutually substitute the respective structures disclosed in the above embodiment and modification example in addition to known art.

According to the present invention, when an airbag is deployed, it is possible to deploy the airbag from between the end portion of the headliner interior material and the surrounding member, while at the same time reliably preventing the falling of an accessory such as a coat hook or an assist grip.

Another aspect of the present invention provides an automobile structure, comprising:

an end portion of a headliner interior material provided on an inner side of a vehicle body in close contact with a surrounding member provided around the end portion at a ceiling portion of a cabin;

an airbag installed in a folded state on an exterior side of the headliner interior material;

the airbag deployed into the cabin from between the end portion and the surrounding member;

the end portion of the headliner interior material formed with a through hole;

an accessory passed through the through hole and fixed to the vehicle body;

the accessory holding the end portion of the headliner interior material around the through hole; and the end portion of the headliner interior material having an exterior-side surface formed with a cut that breaks upon airbag deployment and widens the through hole.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. An automobile interior structure, wherein
an end portion of a headliner interior material provided on an inner side of a vehicle body is in close contact with a surrounding member provided around the end portion at a ceiling portion of a cabin; and
an airbag installed in a folded state on an exterior side of the headliner interior material, upon deployment, is deployed into the cabin from between the end portion and the surrounding member, wherein the end portion of the headliner interior material is formed with a through hole;

an accessory is passed through the through hole and fixed to the vehicle body, and holds the end portion of the headliner interior material around the through hole;

the end portion of the headliner interior material has an exterior-side surface formed with a cut that breaks upon airbag deployment and widens the through hole; and the cut of the end portion connects with the through hole of the end portion.

2. A headliner interior material formed on an inner side of a vehicle body at a ceiling portion of a cabin, wherein an end portion of the headliner interior material is in close contact with a surrounding member provided around the end portion; and an airbag installed in a folded state on an exterior side of the headliner interior material, upon deployment, is deployed into the cabin from between the end portion and the surrounding member, wherein the end portion is formed with a through hole through which an accessory passes and is fixed to the vehicle body while holding the end portion, and is also formed with a cut that breaks upon airbag deployment and widens the though hole, the cut located on an exterior-side surface of the end portion; and the cut of the end portion connects with the through hole of the end portion.

* * * * *